US010841237B2

(12) United States Patent
Todd et al.

(10) Patent No.: US 10,841,237 B2
(45) Date of Patent: Nov. 17, 2020

(54) DECENTRALIZED DATA MANAGEMENT ACROSS HIGHLY DISTRIBUTED SYSTEMS

(71) Applicant: EMC IP Holding Company LLC, Hopkinton, MA (US)

(72) Inventors: Stephen J. Todd, Shrewsbury, MA (US); Said Tabet, Sherborn, MA (US); Assaf Natanzon, Tel Aviv (IL); Dragan Savic, Brookline, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 156 days.

(21) Appl. No.: 15/959,421

(22) Filed: Apr. 23, 2018

(65) Prior Publication Data

US 2019/0327180 A1    Oct. 24, 2019

(51) Int. Cl.
*H04L 12/911* (2013.01)
*H04L 29/08* (2006.01)
*H04L 12/24* (2006.01)
*G06F 16/11* (2019.01)

(52) U.S. Cl.
CPC ............ *H04L 47/70* (2013.01); *G06F 16/122* (2019.01); *H04L 41/0893* (2013.01); *H04L 67/10* (2013.01)

(58) Field of Classification Search
CPC ... G06F 16/122; H04L 41/0893; H04L 47/70; H04L 67/10
See application file for complete search history.

(56) References Cited

U.S. PATENT DOCUMENTS

| | | | |
|---|---|---|---|
| 9,967,334 B2 * | 5/2018 | Ford | H04L 67/1044 |
| 9,990,502 B2 * | 6/2018 | Haager | G06F 21/602 |
| 10,042,782 B2 * | 8/2018 | Struttmann | G06F 16/9024 |
| 10,146,792 B1 * | 12/2018 | Dobrek | G06Q 20/3829 |
| 10,396,997 B2 * | 8/2019 | Brady | H04L 9/3247 |

(Continued)

FOREIGN PATENT DOCUMENTS

WO    WO-2018231255 A1 *  12/2018  ............. G06Q 20/06

OTHER PUBLICATIONS

Alexandru Stanciu. "Blockchain based distributed control system for Edge Computing", 2017 21st International Conference on Control Systems and Computer Science, Bucharest, Romania, presented May 30, 2017, 5 pages. (Year: 2017).*

(Continued)

*Primary Examiner* — George C Neurauter, Jr.
(74) *Attorney, Agent, or Firm* — Ryan, Mason & Lewis, LLP

(57) ABSTRACT

In a system environment comprising a plurality of computing resources, wherein at least a portion of the computing resources are mobile, a method maintains a decentralized messaging network of interconnected messaging nodes and a decentralized data network of interconnected data nodes. Each of the plurality of computing resources is associated with a given messaging node and a given data node. The method manages transfer of a data set between the plurality of computing resources in association with the decentralized messaging network and the decentralized data network. Managing transfer of the data set comprises inserting a policy file into the decentralized data network specifying one or more policies for managing the transfer of the data set and inserting a message into the decentralized messaging network instructing implementation of the one or more policies.

21 Claims, 12 Drawing Sheets

(56) References Cited

U.S. PATENT DOCUMENTS

| | | | | |
|---|---|---|---|---|
| 10,484,473 | B2* | 11/2019 | Moorthi | H04L 67/2847 |
| 2017/0031676 | A1* | 2/2017 | Cecchetti | G06F 8/65 |
| 2017/0103468 | A1* | 4/2017 | Orsini | G06Q 40/12 |
| 2017/0286717 | A1* | 10/2017 | Khi | H04L 63/06 |
| 2017/0287090 | A1* | 10/2017 | Hunn | G06Q 50/18 |
| 2017/0364701 | A1* | 12/2017 | Struttmann | G06F 21/78 |
| 2017/0374151 | A1* | 12/2017 | Moorthi | H04L 67/1097 |
| 2018/0005186 | A1* | 1/2018 | Hunn | G06F 16/219 |
| 2018/0137306 | A1* | 5/2018 | Brady | H04L 9/0643 |
| 2018/0139056 | A1* | 5/2018 | Imai | H04L 9/3247 |
| 2018/0219686 | A1* | 8/2018 | Cronie | G06Q 20/065 |
| 2019/0020665 | A1* | 1/2019 | Surcouf | H04L 67/10 |
| 2019/0068615 | A1* | 2/2019 | Pack | H04L 63/126 |
| 2019/0102409 | A1* | 4/2019 | Shi | G06F 16/2379 |
| 2019/0102423 | A1* | 4/2019 | Little | G06F 16/2379 |
| 2019/0102755 | A1* | 4/2019 | Owens | G06Q 20/02 |
| 2019/0104196 | A1* | 4/2019 | Li | G06F 16/2379 |
| 2019/0122317 | A1* | 4/2019 | Hunn | G06Q 20/405 |
| 2019/0132350 | A1* | 5/2019 | Smith | G06F 21/577 |
| 2019/0215159 | A1* | 7/2019 | Notani | H04L 9/0863 |
| 2019/0238486 | A1* | 8/2019 | Zizka | H04L 9/0637 |
| 2019/0306173 | A1* | 10/2019 | Reddy | H04L 9/3247 |
| 2019/0324989 | A1* | 10/2019 | Borochoff | G06F 16/173 |
| 2019/0340379 | A1* | 11/2019 | Beecham | G06F 16/9024 |
| 2019/0349205 | A1* | 11/2019 | Brady | G06F 8/65 |

OTHER PUBLICATIONS

Mathis Steichen, Beltran Fiz, Robert Norvill, Wazen Shbair, Radu State. "Blockchain-Based, Decentralized Access Control for IPFS", 2018 IEEE Confs on Internet of Things, Jul. 30-Aug. 3, 2018, Halifax, Canada, 8 pages. (Year: 2018).*

Xueping Liang et al. "ProvChain: A Blockchain-based Data Provenance Architecture in Cloud Environment with Enhanced Privacy and Availability", 2017 17th IEEE/ACM International Symposium on Cluster, Cloud and Grid Computing, May 2017, 11 pages. (Year: 2017).*

Satoshi Nakamoto, "Bitcoin: A Peer-to-Peer Electronic Cash System," http://bitcoin.org/bitcoin.pdf, 2008, 9 pages.

Juan Benet, "IPFS—Content Addressed, Versioned, P2P File System (Draft 3)," arxiv: 1407.3561v1, Jul. 14, 2014, 11 pages.

U.S. Appl. No. 15/730,990, filed in the name of Stephen Todd et al. on Oct. 12, 2017 and entitled "Data Management for Extended Multi-Cloud Environment."

U.S. Appl. No. 15/898,443, filed in the name of Kelly G. Kanellakis et al. on Feb. 17, 2018 and entitled "Ad-Hoc Mobile Computing."

* cited by examiner

DMN – decentralized messaging node

DDN —decentralized data node

900

902 — IN A SYSTEM ENVIRONMENT COMPRISING A PLURALITY OF COMPUTING RESOURCES, WHEREIN AT LEAST A PORTION OF THE COMPUTING RESOURCES ARE MOBILE, MAINTAIN A DECENTRALIZED MESSAGING NETWORK OF INTERCONNECTED MESSAGING NODES AND A DECENTRALIZED DATA NETWORK OF INTERCONNECTED DATA NODES, WHEREIN EACH OF THE PLURALITY OF COMPUTING RESOURCES IS ASSOCIATED WITH A GIVEN MESSAGING NODE AND A GIVEN DATA NODE

904 — MANAGE TRANSFER OF A DATA SET BETWEEN THE PLURALITY OF COMPUTING RESOURCES IN ASSOCIATION WITH THE DECENTRALIZED MESSAGING NETWORK AND THE DECENTRALIZED DATA NETWORK, WHEREIN MANAGING TRANSFER OF THE DATA SET COMPRISES INSERTING A POLICY FILE INTO THE DECENTRALIZED DATA NETWORK SPECIFYING ONE OR MORE POLICIES FOR MANAGING THE TRANSFER OF THE DATA SET, AND INSERTING A MESSAGE INTO THE DECENTRALIZED MESSAGING NETWORK INSTRUCTING IMPLEMENTATION OF THE ONE OR MORE POLICIES, SUCH THAT EACH OF THE PLURALITY OF COMPUTING RESOURCES OBTAINS THE POLICY FILE AND IMPLEMENTS THE ONE OR MORE POLICIES

FIG. 9

DECENTRALIZED DATA MANAGEMENT ACROSS HIGHLY DISTRIBUTED SYSTEMS

FIELD

The field relates generally to networks of computing resources, and more particularly to techniques for data management in such networks of computing resources.

BACKGROUND

Enterprises or other entities typically have a large information technology (IT) infrastructure comprising a network of computing resources distributed across a geographic environment. In many scenarios, these computing resources are mobile and may be referred to as mobile compute platforms. These mobile compute platforms, along with servers that communicate with the mobile compute platforms, collectively form a highly distributed system. Mobile compute platforms may be in a variety of forms including, but not limited to, employee mobile devices, customer mobile devices, vehicles (e.g., drones, planes, cars, trucks, other shipping transports, etc.), Internet of Things (IoT) devices (e.g., sensors, tags, other monitoring or display systems, etc.), etc.

It is often necessary to transfer large data sets to these mobile compute platforms, many of which are continuously moving. However, data management in such highly distributed systems can be very challenging.

SUMMARY

Embodiments of the invention provide systems and methods for decentralized data management in a network of computing resources such as, by way of example, a highly distributed system.

For example, in one embodiment, a method comprises the following steps. In a system environment comprising a plurality of computing resources, wherein at least a portion of the computing resources are mobile, the method maintains a decentralized messaging network of interconnected messaging nodes and a decentralized data network of interconnected data nodes. Each of the plurality of computing resources is associated with a given messaging node and a given data node. Further, the method manages transfer of a data set between the plurality of computing resources in association with the decentralized messaging network and the decentralized data network. Managing transfer of the data set comprises inserting a policy file into the decentralized data network specifying one or more policies for managing the transfer of the data set and inserting a message into the decentralized messaging network instructing implementation of the one or more policies, such that each of the plurality of computing resources obtains the policy file and implements the one or more policies. Transfer of the data set is also effectuated using the decentralized messaging network and the decentralized data network.

Advantageously, illustrative embodiments utilize decentralized data management techniques to optimize data movement and management during frequent transfers of large data sets to a continuously moving set of compute platforms.

These and other features and advantages of the invention will become more readily apparent from the accompanying drawings and the following detailed description.

BRIEF DESCRIPTION OF THE DRAWINGS

FIG. 9 illustrates a methodology for decentralized management of data associated with a highly distributed system with decentralized messaging network and decentralized data network overlays, according to an illustrative embodiment.

DETAILED DESCRIPTION

Figure 1:
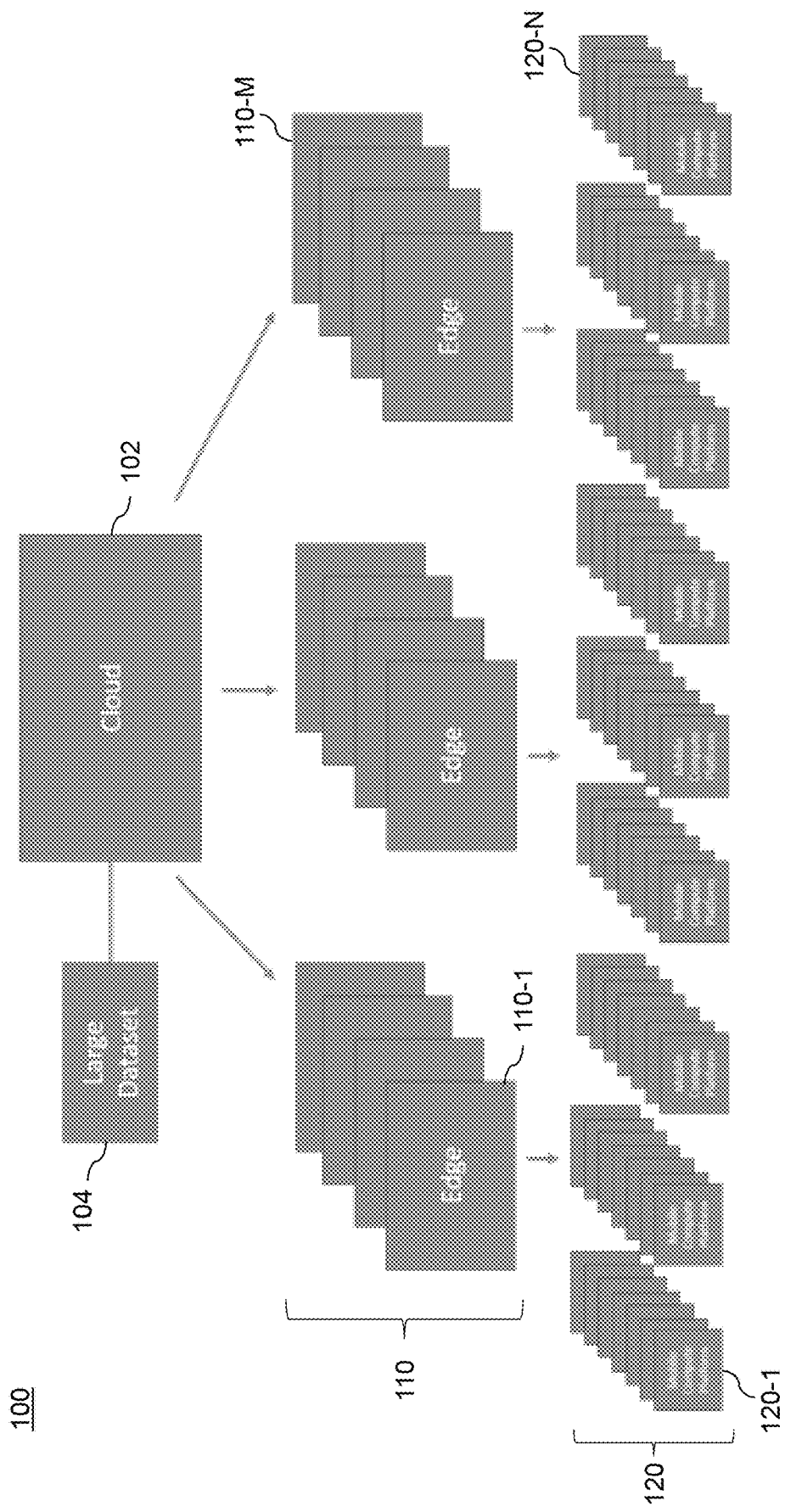
FIG. 1 illustrates a highly distributed system environment with which one or more illustrative embodiments may be implemented.

Illustrative embodiments will be described herein with reference to exemplary information processing systems and associated host devices, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual computing resources. An information processing system may therefore comprise, for example, a cloud infrastructure hosting multiple tenants that share cloud computing resources. Such systems are considered examples of what are more generally referred to herein as cloud computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather are respectively controlled and managed by third-party cloud providers, are typically considered "public clouds." Thus, enterprises can choose to host their applications or services on private clouds, public clouds, and/or a combination of private and public clouds (hybrid clouds) with a vast array of computing resources attached to or otherwise a part of such IT infrastructure.

Illustrative embodiments provide techniques for decentralized data management in an information processing system comprising a plurality of mobile compute platforms. Such mobile compute platforms comprise one or more mobile computing resources. The term "computing resource," as illustratively used herein, can refer to any device, endpoint, component, element, or other resource, that is capable of performing processing and/or storage functions and is capable of communicating with the system. As mentioned above, non-limiting examples of such mobile compute platforms include employee mobile devices, customer mobile devices, vehicles (e.g., drones, planes, cars, trucks, other shipping transports, etc.), Internet of Things (IoT) devices (e.g., sensors, tags, other monitoring or display systems, etc.), etc.

An information processing system that comprises such diverse and distributed computing resources, at least some of which are mobile, is illustratively referred to herein as a highly distributed system. An example of a highly distributed system environment is shown in FIG. 1.

As shown in FIG. 1, highly distributed system environment 100 comprises a cloud platform 102 that contains a large data set 104 that the cloud platform seeks to push out, through an intermediary layer 110 with a plurality of edge servers 110-1 through 110-M, to computing resources in a bottom layer 120 that are part of a plurality of mobile compute platforms (MCPs) 120-1 through 120-N. Note that the cloud platform 102 and the edge servers 110-1 through 110-M may be considered computing resources as well. The cloud platform 102 may comprise a public cloud or a private cloud. Examples of public clouds may include, but are not limited to, Amazon Web Services® (AWS), Google Compute Engine® (GCE), and Windows Azure® Services platforms. The highly distributed system environment may employ heterogeneous and varied network connections, from carrier-grade service level agreement (SLA)-capable networks to torrent-like, peer-to-peer networks.

Highly distributed system environment 100 in FIG. 1 represents a variety of use cases in which frequent downloads of massive data sets occurs to MCPs. For example, it may be necessary or desired to download a large data set to a set of MCPs comprising passenger vehicles, drones, shipping vehicles, employee devices, etc. It is to be appreciated that many of these MCP devices are compute-constrained (e.g., configured with limited processing capabilities, as well as with limited storage, network, and other resource-related capabilities). The data being transferred may represent any kind of data, by way of example only, new software downloads, maps, customer information, weather pattern data, etc. Note that while the illustrative descriptions herein relate to data download use cases (i.e., data transferring from the cloud platform 102 to MCPs 120-1 through 120-N), the same architecture shown in highly distributed system environment 100 may be used for data upload use cases (i.e., data transferring from MCPs 120-1 through 120-N to the cloud platform 102) as well.

However, it is realized herein that frequent transfers of large data sets to MCPs run into a variety of problems, examples of which will now be described.

Limited Bandwidth.

The amount of network bandwidth required for (two-way) communication in the highly distributed system environment 100 in FIG. 1 is not enough to handle the massive amount of data movement required to frequently download or upload new, large data sets with respect to hundreds of thousands of MCPs.

Insufficient Compute Resources.

The hardware located within these MCPs often does not possess enough storage, memory, compute, and network capabilities.

Ad-Hoc Connectivity.

MCPs go in and out of range for certain geographic zones, or they may completely drop their connectivity.

Data Management.

The control and management of data being moved in this environment (e.g., copy management, deletion policies, retention policies, etc.) is challenging to implement at scale.

Audit Support.

Data management decisions (e.g., deletions, transfers, etc.) made in MCPs cannot be conclusively queried.

Analytic Support.

The running of real-time algorithms on large data sets and the tracing of the lineage of the results is challenging in a compute-constrained environment.

Security and Privacy.

The transfer of the data, protection during transfer, and (auditable) maintenance of privacy is challenging.

Illustrative embodiments overcome the above and other drawbacks. More particularly, illustrative embodiments provide techniques for decentralized management of data associated with a highly distributed system using decentralized messaging network and decentralized data network overlays.

Figure 2A:
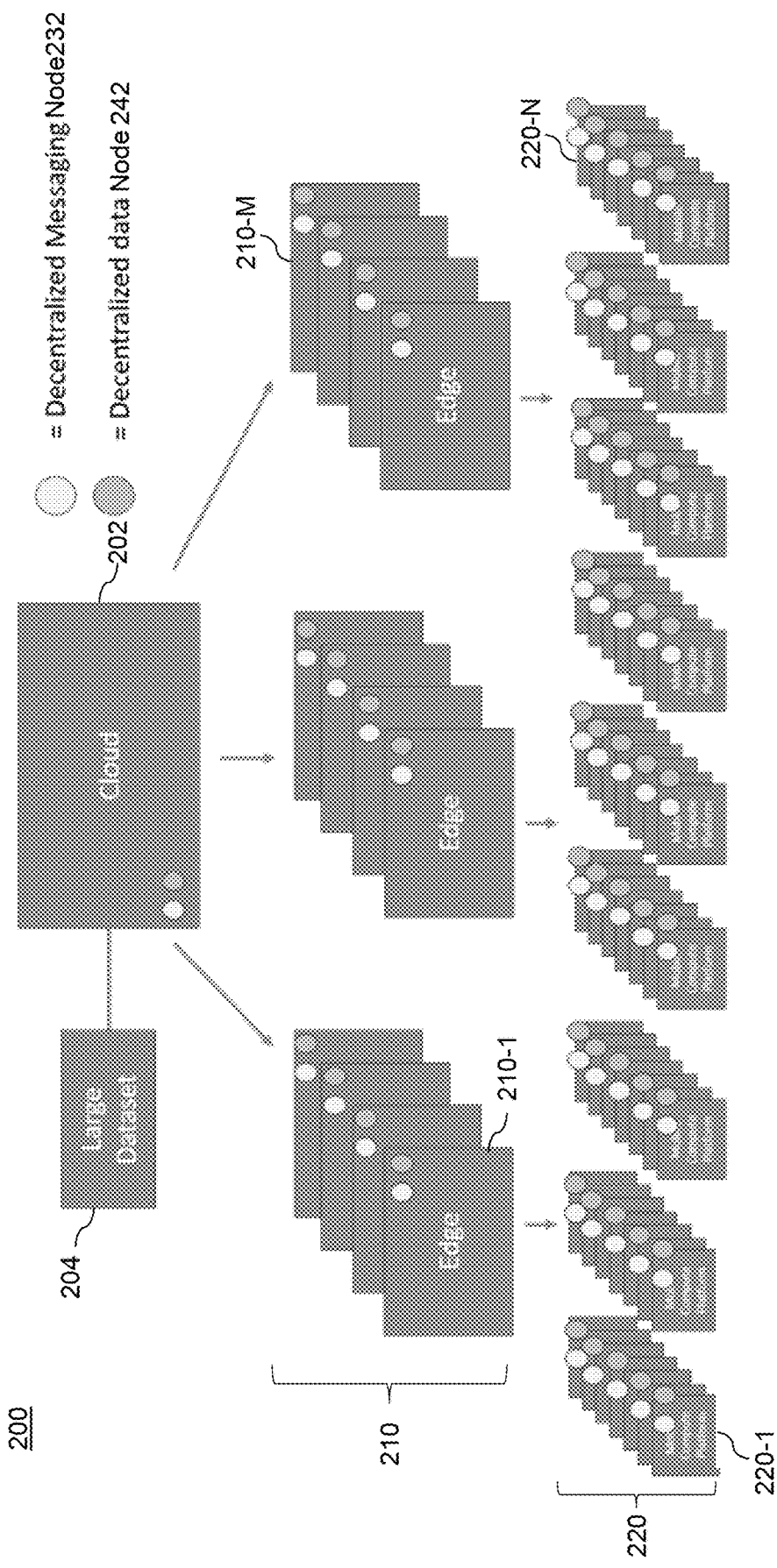
FIG. 2A illustrates a highly distributed system environment with decentralized messaging network and decentralized data network overlays, according to an illustrative embodiment.

FIG. 2A illustrates a highly distributed system environment with decentralized messaging network and decentralized data network overlays, according to an illustrative embodiment. As shown, highly distributed system environment 200 comprises a cloud platform 202 that contains a large data set 204 that the cloud platform seeks to push out, through an intermediary layer 210 with a plurality of edge servers 210-1 through 210-M, to computing resources in a bottom layer 220 that are part of a plurality of MCPs 220-1 through 220-N. Note that the cloud platform 202 and the edge servers 210-1 through 210-M may be considered computing resources as well. Further note that highly distributed system environment 200 in FIG. 2A is similar in architecture to highly distributed system environment 100 in FIG. 1 with the important exception that system environment 200 is configured with overlays comprising a decentralized messaging network (230 in FIG. 2B) of decentralized messaging nodes (DMNs) 232 and a decentralized data network (240 in FIG. 2C) of decentralized data nodes (DDNs) 242, as will be further explained.

As shown, cloud platform 202, each of edge servers 210-1 through 210-M, and each of MCPs 220-1 through 220-N comprise a DMN 232 and a DDN 242. The network of DMNs 232 are interconnected to form the decentralized messaging network 230 as illustratively shown in FIG. 2B, while the network of DDNs 242 are interconnected to form the decentralized data network 240 as illustratively shown in FIG. 2C.

In one illustrative embodiment, the decentralized messaging network 230 and the decentralized data network 240 can be implemented via decentralized message passing and decentralized shared data namespace approaches described in U.S. Ser. No. 15/730,990, filed on Oct. 12, 2017 and entitled "Data Management for Extended Multi-Cloud Environment," the disclosure of which is incorporated by reference herein in its entirety. However, it is to be understood that the decentralized messaging network 230 and the decentralized data network 240 can be implemented using alternative approaches and overlay architectures.

In one or more illustrative embodiments, the DMNs 232 of decentralized messaging network 230 may be blockchain nodes operatively coupled to form a distributed ledger system.

As used herein, the terms "blockchain," "digital ledger" and "blockchain digital ledger" may be used interchangeably. As is known, the blockchain or digital ledger protocol is implemented via a distributed, decentralized computer network of compute nodes (e.g., DMNs 232). The compute nodes are operatively coupled in a peer-to-peer communications protocol (e.g., as illustratively depicted in FIG. 2B). In the computer network, each compute node is configured to maintain a blockchain which is a cryptographically secured record or ledger of data blocks that represent respective transactions within a given computational environment. The blockchain is secured through use of a cryptographic hash function. A cryptographic hash function is a cryptographic function which takes an input (or "message") and returns a fixed-size alphanumeric string, which is called the hash value (also a message digest, a digital fingerprint, a digest, or a checksum). Each blockchain is thus a growing list of data records hardened against tampering and revision, and typically includes a timestamp, current transaction data, and information linking it to a previous block. More particularly, each subsequent block in the blockchain is a data block that includes a given transaction(s) and a hash value of the previous block in the chain, i.e., the previous transaction. That is, each block is typically a group of transactions. Thus, advantageously, each data block in the blockchain represents a given set of transaction data plus a set of all previous transaction data.

Figure 2B:
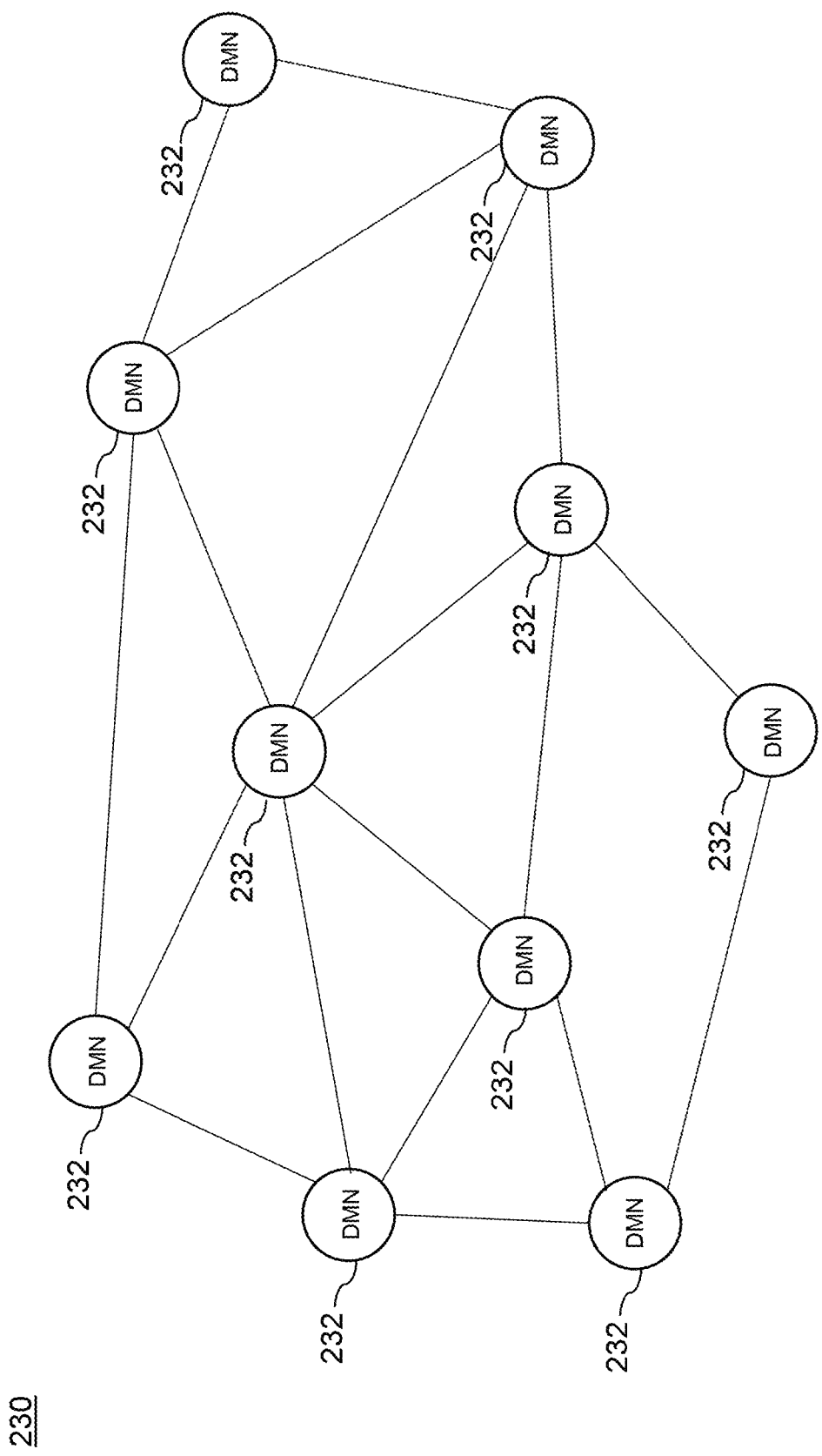
FIG. 2B illustrates a decentralized messaging network, according to an illustrative embodiment.

Accordingly, it is to be understood that cloud platform 202, each of edge servers 210-1 through 210-M, and each of MCPs 220-1 through 220-N shown in the environment 200 in FIG. 2A either hosts thereon or is otherwise in communication with at least one of the DMNs 232 in FIG. 2B. That is, cloud platform 202, each of edge servers 210-1 through 210-M, and each of MCPs 220-1 through 220-N are configured to store one or more transactions on the distributed ledger at a corresponding DMN 232 such that the one or more transactions are immutably stored on the distributed ledger and securely accessible by the plurality of DMNs 232 (and thus by cloud platform 202, each of edge servers 210-1 through 210-M, and each of MCPs 220-1 through 220-N). In illustrative embodiments, examples of transactions that can be stored on the distributed ledger include, but are not limited to, messages passed between cloud platform 202, each of edge servers 210-1 through 210-M, and each of MCPs 220-1 through 220-N to effectuate the transfer of large data set 204.

In the case of a "bitcoin" type implementation of a blockchain distributed ledger, the blockchain contains a record of all previous transactions that have occurred in the bitcoin network. The bitcoin system was first described in S. Nakamoto, "Bitcoin: A Peer to Peer Electronic Cash System," 2008, the disclosure of which is incorporated by reference herein in its entirety. A key principle of the blockchain is that it is trusted. That is, it is critical to know that data in the blockchain has not been tampered with by any of the compute nodes in the computer network (or any other node or party). For this reason, a cryptographic hash function is used. While such a hash function is relatively easy to compute for a large data set, each resulting hash value is unique such that if one item of data in the blockchain is altered, the hash value changes. However, it is realized that given the constant generation of new transactions and the need for large scale computation of hash values to add the new transactions to the blockchain, the blockchain protocol rewards compute nodes that provide the computational service of calculating a new hash value. In the case of a bitcoin network, a predetermined number of bitcoins are awarded for a predetermined amount of computation. The compute nodes thus compete for bitcoins by performing computations to generate a hash value that satisfies the blockchain protocol. Such compute nodes are referred to as "miners." Performance of the computation of a hash value that satisfies the blockchain protocol is called "proof of work." While bitcoins are one type of reward, blockchain protocols can award other measures of value (monetary or otherwise) to successful miners.

It is to be appreciated that the above description represents an illustrative implementation of the blockchain protocol and that embodiments are not limited to the above or any particular blockchain protocol implementation. As such, other appropriate processes may be used to securely maintain and add to a set of data in accordance with embodiments of the invention. For example, distributed ledgers such as, but not limited to, R3 Corda, Ethereum, and Hyperledger may be employed in alternative embodiments.

In one or more illustrative embodiments, the DDNs 242 of decentralized data network 240 may be data sharing nodes operatively coupled to form a data sharing system. For example, such a data sharing system may implement the Interplanetary File System (IPFS) protocol. More particularly, IPFS is an open-source protocol that provides a decentralized method of storing and sharing files relying on a content-addressable, peer-to-peer hypermedia distribution. The compute nodes in an IPFS network form a distributed file system. The IPFS protocol was developed to replace the HyperText Transfer Protocol (HTTP) of the Internet which relies on location addressing (i.e., using Internet Protocol (IP) addresses to identify the specific computing resource that is hosting a desired data set). As such, the subject data set must be retrieved from the computing resource where it originated or some computing resource within the content delivery network (CDN) each time the data set is requested.

Figure 2C:
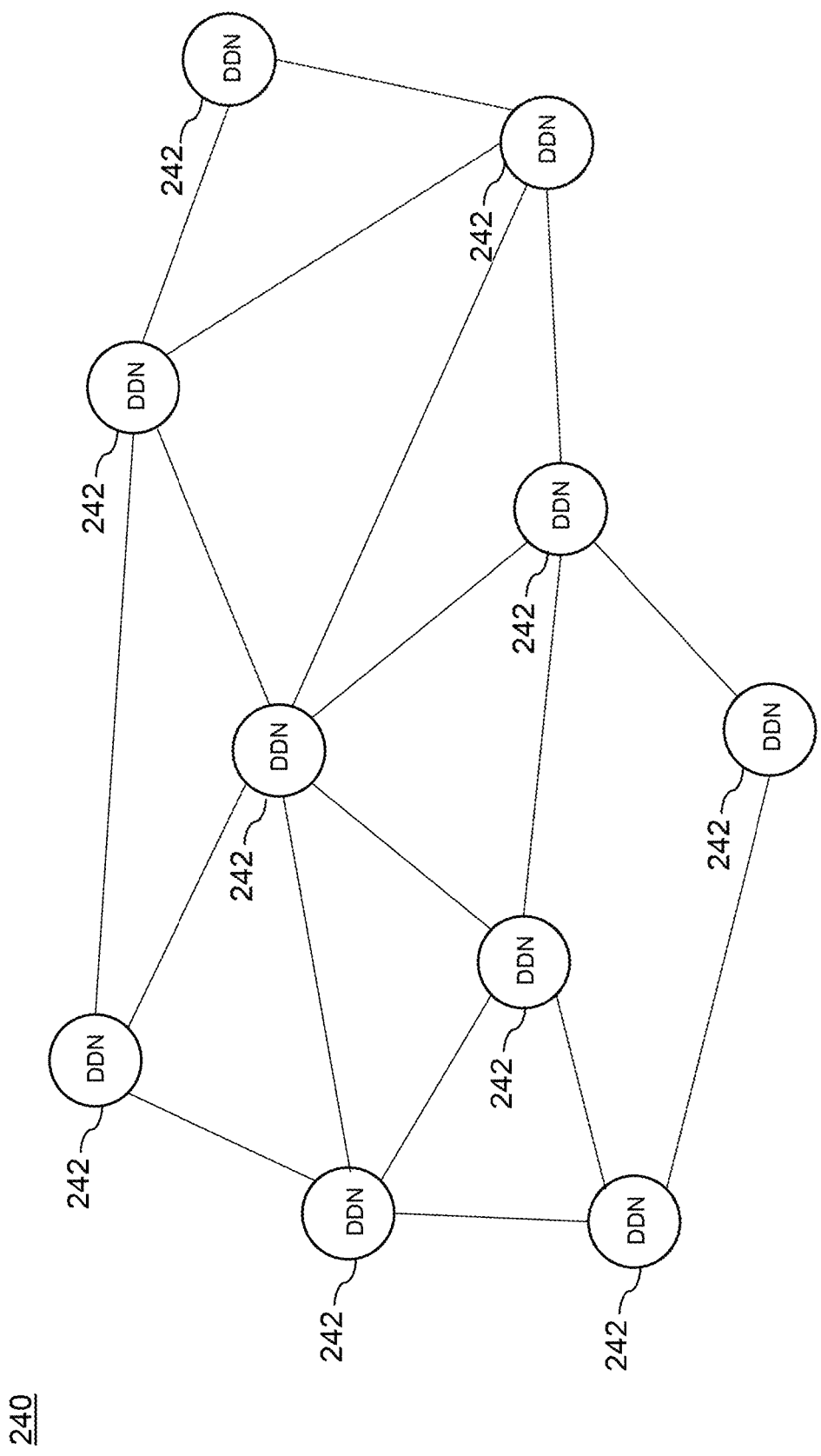
FIG. 2C illustrates a decentralized data network, according to an illustrative embodiment.

IPFS operates by operatively coupling cloud platform 202, each of edge servers 210-1 through 210-M, and each of MCPs 220-1 through 220-N with the same system of files via a system of nodes (e.g., DDNs 242 in FIG. 2C). More particularly, IPFS uses a distributed hash table (DHT) with a block exchange (BitSwap) and namespace methodology that operates across disparate devices and unreliable networks. IPFS operates similarly to a torrent system, except that rather than exchanging media, IPFS exchanges Objects based on a key-value data store. Any type of content can be inserted into the data sharing system, and the system returns a key (i.e., in form of hash value) that can be used to retrieve the content from a node that has it stored thereon at any time. Accordingly, IPFS is a content addressing protocol instead of a location addressing protocol. That is, the hash value is independent of the origin of the data set and can be hosted anywhere in the system.

In one example, the IPFS system is further described in J. Benet, "IPFS—Content Addressed, Versioned, P2P File System," 2014, the disclosure of which is incorporated by reference herein in its entirety. However, illustrative embodiments are not limited to this particular data sharing system and alternative systems may be employed.

Accordingly, it is to be understood that cloud platform 202, each of edge servers 210-1 through 210-M, and each of mobile compute platforms 220-1 through 220-N shown in system environment 200 in FIG. 2A either hosts thereon or is otherwise in communication with at least one of the DDNs 242 in FIG. 2C. That is, cloud platform 202, each of edge servers 210-1 through 210-M, and each of MCPs 220-1 through 220-N are each configured through their respective DDN 242 to maintain a DHT and to execute the IPFS protocol to retrieve content from one or more other DDNs (and thus from cloud platform 202, each of edge servers 210-1 through 210-M, and each of MCPs 220-1 through 220-N) as needed.

It is to be appreciated that one or more DDNs 242 may be co-located with one or more DMNs 232 such that both node types reside on or are otherwise associated with cloud platform 202, each of edge servers 210-1 through 210-M, and each of MCPs 220-1 through 220-N.

Given the illustrative architectures described above in the context of FIGS. 2A through 2C, methodologies for managing large data set 204 according to illustrative embodiments will now be described.

Assume that a large data set, referred to as "Data Set A," needs to be downloaded from cloud platform 202 to a large number (or all) of MCPs 220-1 through 220-N. Note that, in one or more illustrative embodiments, each MCP (220-1 through 220-N) may represent one mobile compute device (e.g., a vehicle, employee computer or tablet, or other mobile device). Further assume that the edge servers 210-1 through 210-M between the cloud platform 202 and the MCPs 220-1 through 220-N do not have enough bandwidth to download a copy to every device, and/or also assume that there may not be enough storage capacity in each device to store the entire file.

Figure 3:
FIG. 3 illustrates an example of a data management policy file, according to an illustrative embodiment.

In accordance with one or more illustrative embodiments, before downloading the file, a cloud operator (associated with cloud platform 202) specifies one or more data management policies in a policy file. These one or more policies instruct the entire system environment 200 how to handle the download and distribution of files of type "Data Set A". FIG. 3 illustrates an example of such policies in a data management policy file 300, according to an illustrative embodiment.

In policy file 300, as shown, the cloud operator is specifying the minimum percentage of Data Set A that must be downloaded and stored on each device. For edge servers (210-1 through 210-M), the cloud operator is stating that the data set must be downloaded in its entirety (i.e., "1:1" as specified in the policy file 300).

For MCPs 220-1 through 220-N, the cloud operator is specifying that a minimum of $1/64^{th}$ of the data set type must be downloaded and more can be stored if there is enough space (i.e., minimum of "1:64" as specified in the policy file 300). Note that a maximum can also be specified if desired.

In order for the policy file 300 to be distributed across the entire system environment 200, the DMNs 232 of the decentralized messaging network 230 and the DDNs 242 of the decentralized data network 240 are used. For example, a copy of the policy file 300 can be stored as an object in Elastic Cloud Store (Dell EMC Corporation), or it can be stored as a file in the IPFS data sharing system (network 240).

Figure 4:
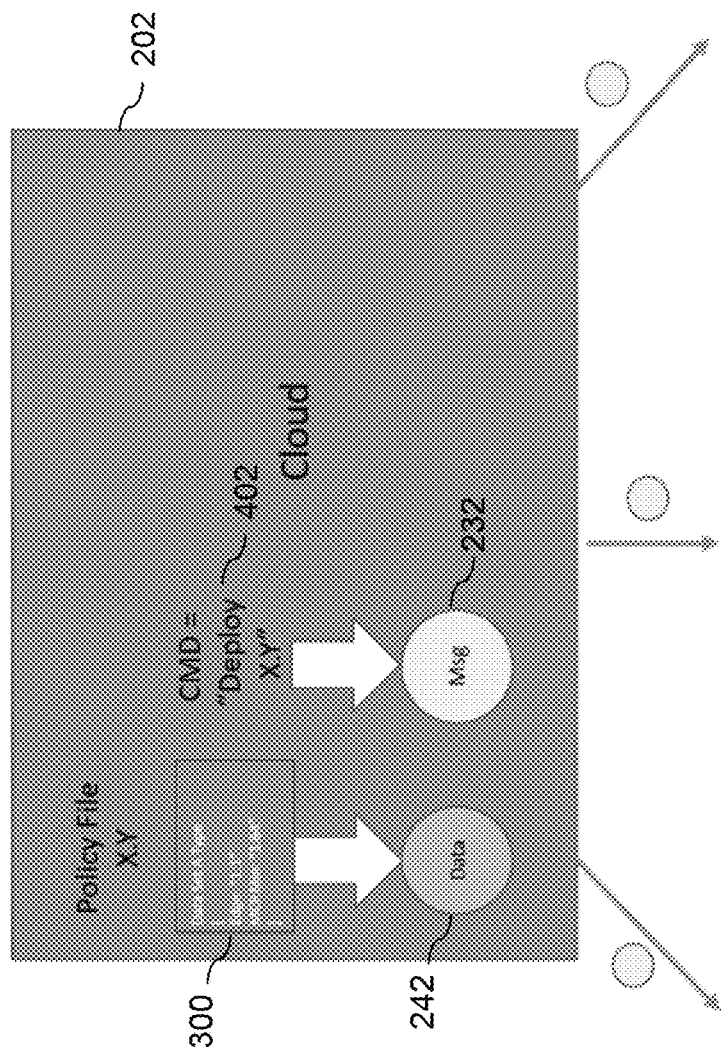
FIG. 4 illustrates a process of applying a data management policy, according to an illustrative embodiment.

FIG. 4 illustrates a process 400 of applying a data management policy, according to an illustrative embodiment. The policy file 300 is assigned a unique content address (CA). A pointer to this CA, and a command 402 to upgrade to the new policy file, can then be inserted into the decentralized messaging network 230 via the DMN 232 associated with cloud platform 202. The policy file 300 itself is stored in the DDN 242, associated with cloud platform 202, of the decentralized data network 240. Thus, each edge server 210-1 through 210-M and each MCP 220-1 through 220-N fetches the policy file 300 via the shared data namespace using the pointer received in the upgrade message, and then the policies in the policy file 300 are applied locally (at each of the edge servers 210-1 through 210-M, and at each of MCPs 220-1 through 220-N). Note that the distribution of the data set, in theory, can occur from anywhere in the system environment. The administrator submitting this message should therefore have credentials that others do not have (e.g., a private key).

As the command to apply the new policy file is received and executed, each of the edge servers 210-1 through 210-M and each of MCPs 220-1 through 220-N can log the adoption of the new policy. This logging can occur in a number of different ways including, but not limited to: (a) locally; (b) on the messaging bus; and/or (c) in a distributed ledger such as a blockchain (e.g., network 230). Logging the adoption of the policy file can then be audited (e.g., to determine what percentage of the system environment 200 is running the new policy).

Figure 5:
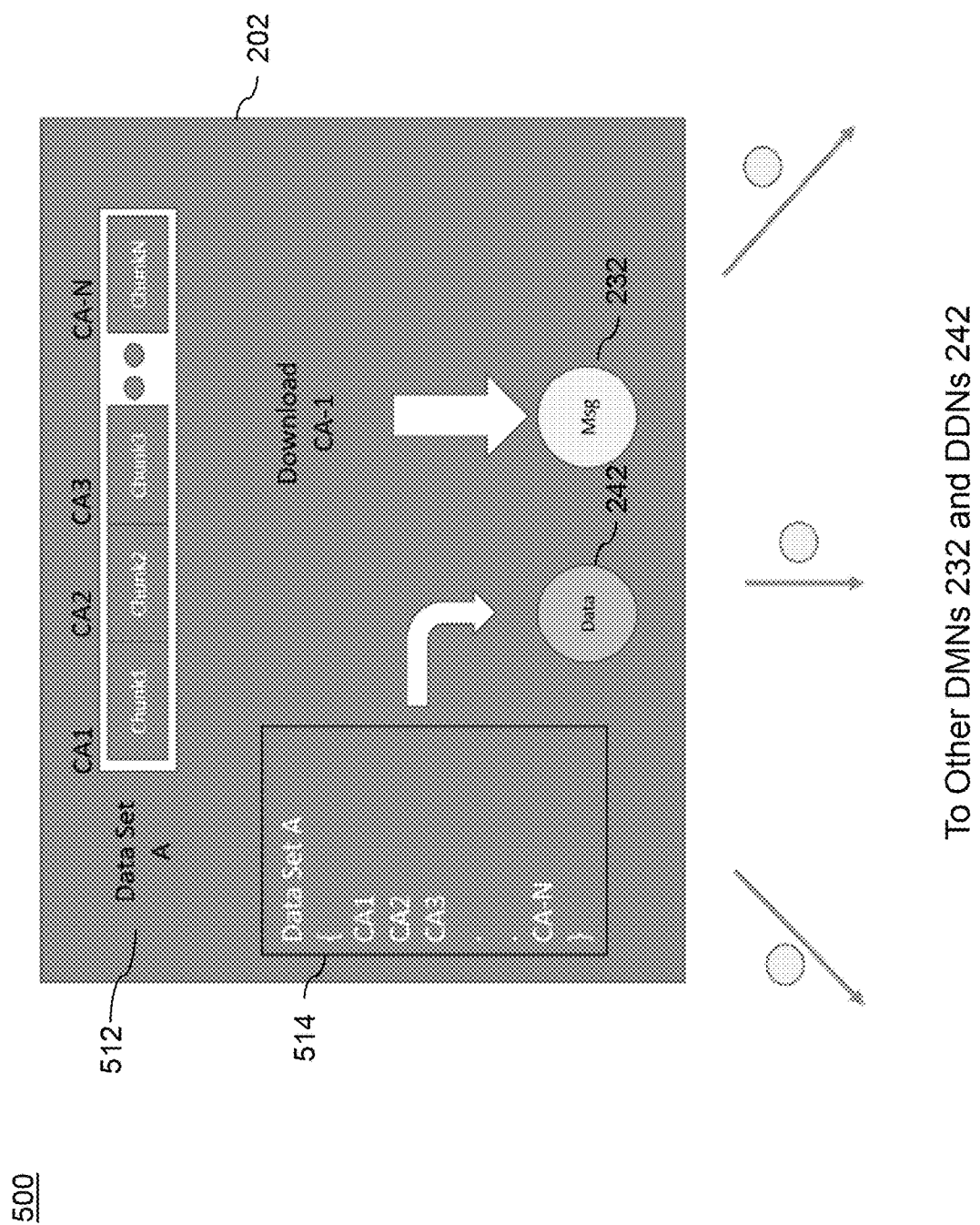
FIG. 5 illustrates a process of downloading a new data set, according to an illustrative embodiment.

FIG. 5 illustrates a process 500 of downloading a new data set into the system environment 200, according to an illustrative embodiment. Assume that this data set (Data Set A) is one terabyte in size and can be broken up into N chunks (e.g., in this case 128 chunks), as denoted by chunking operation 512, whereby each chunk has its own content address (CA1, CA2, CA3, . . . CA-N). The cloud operator stores object 514 (for Data Set A) into the decentralized name space (network 240 via its corresponding DDN 242) and also publishes a message and CA pointers (on network 230 using its DMN 232) instructing the system environment 200 to download one or more data chunks of the new data set.

Figure 6:
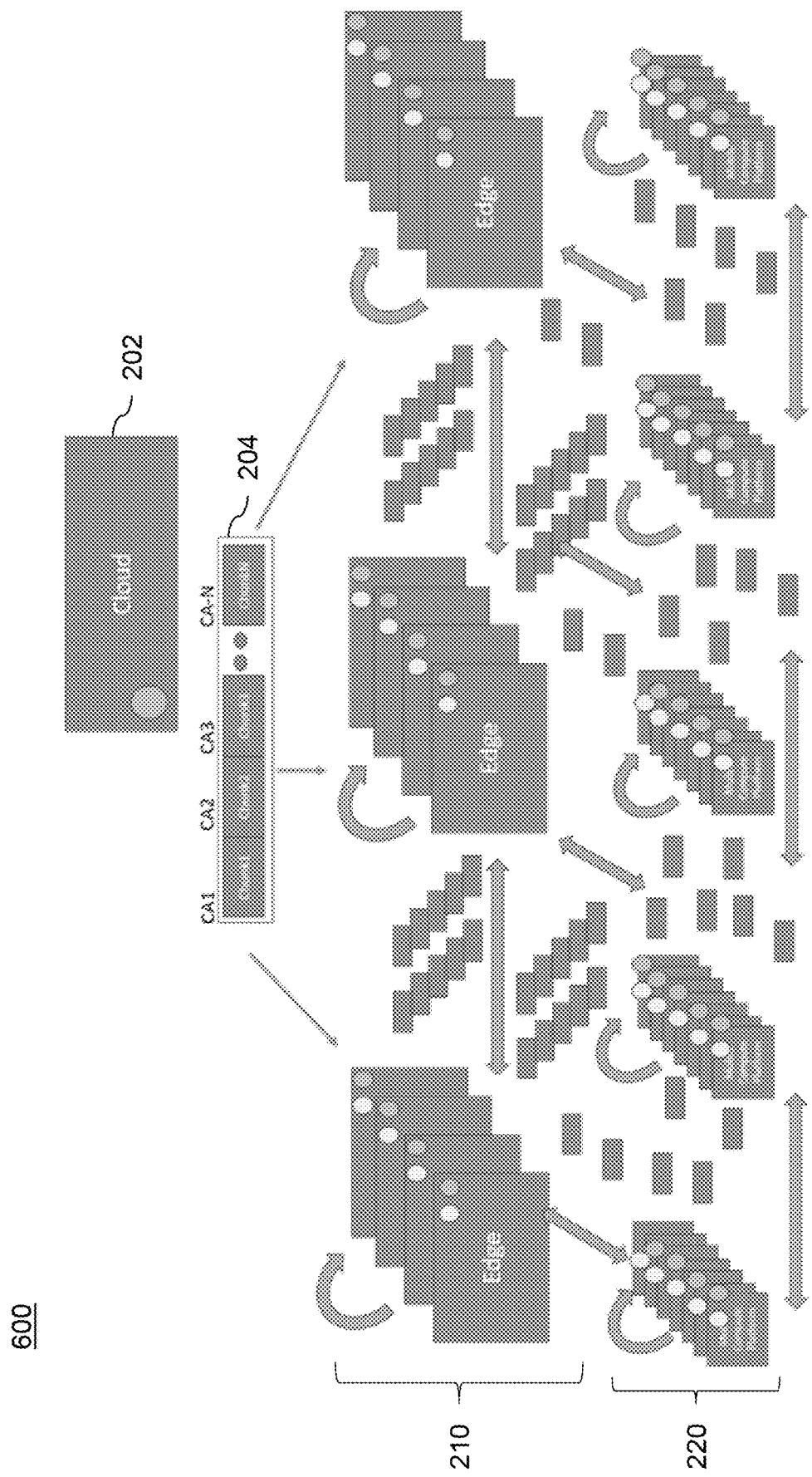
FIG. 6 illustrates a reduced network traffic scenario in a highly distributed system with decentralized messaging network and decentralized data network overlays, according to an illustrative embodiment.

FIG. 6 illustrates a reduced network traffic scenario 600 in a highly distributed system with decentralized messaging network and decentralized data network overlays, according to an illustrative embodiment. One of the goals of the decentralized data management techniques described herein is to distribute the new data set across the system environment in a prompt fashion that does not overwhelm computing resources (e.g., the network, or the amount of local storage) and also complies with the policy file (e.g., 300). For this reason, as depicted in FIG. 6, when the edge servers 210-1 through 210-M receive the command from cloud platform 202 to download the entire new file 204 (per the policy), they can do so via the shared decentralized data namespace (network 240). If an IPFS (or torrent) approach is used, there is an opportunity for the edge servers 210-1 through 210-M to locally share (among themselves) segments that they have already downloaded. This has the advantage of minimizing the amount of data transferred from the cloud platform 202. Similarly, MCPs 220-1 through 220-N can also locally share (among themselves) segments that they have already downloaded. This has the advantage of minimizing the amount of data transferred from the edge servers 210-1 through 210-M.

As mentioned above, MCPs 220-1 through 220-N may have limited storage capabilities, and therefore they are not necessarily required to download an entire file, but only a portion (e.g., $1/64^{th}$ of the data set as per policy file 300). This can be accomplished by leveraging a Distributed Hash Table (DHT) that identifies where all the chunks currently are located and keeping track of a "have list" and "want list" on each DDN 242. This can be accomplished with IPFS as shown in FIG. 7.

Figure 7:
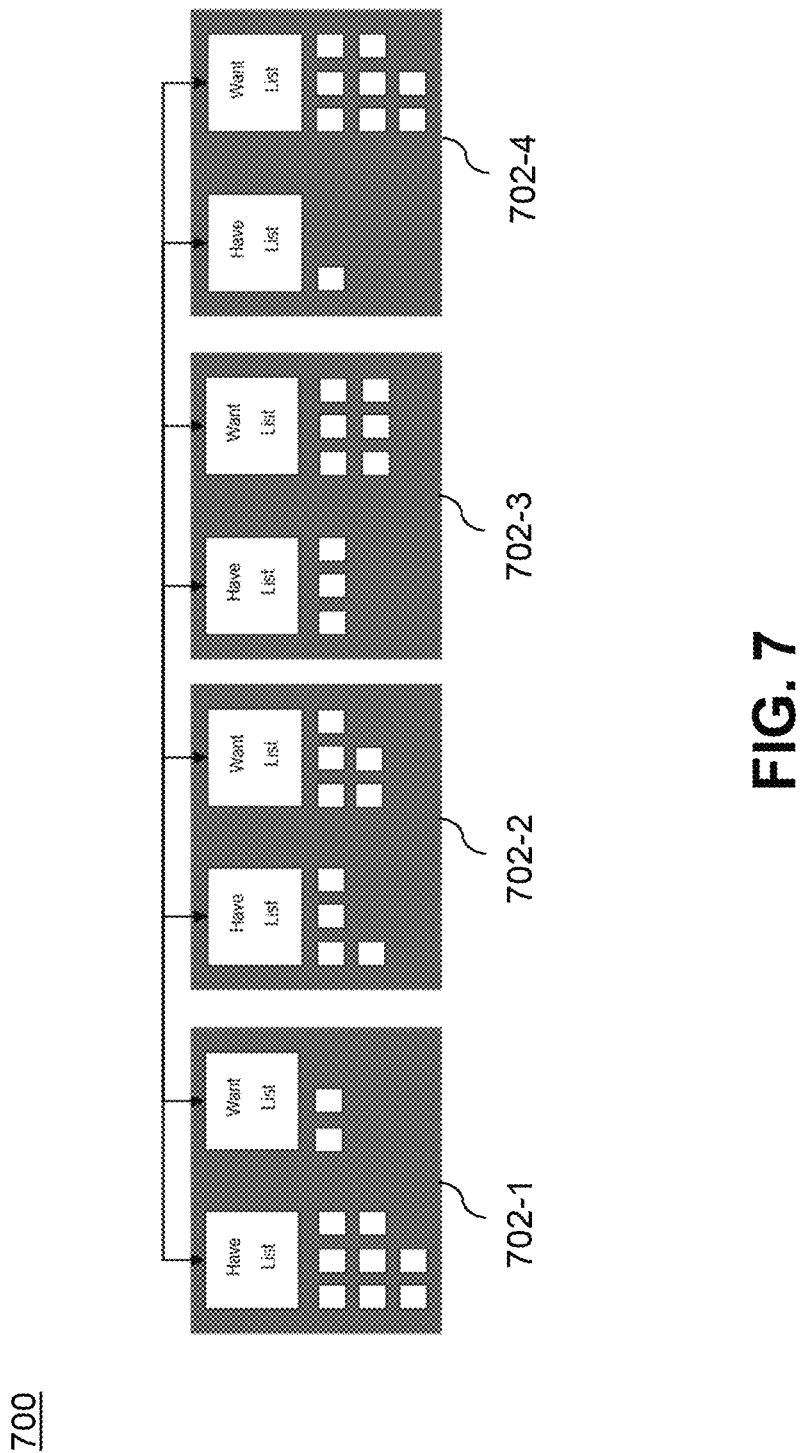
FIG. 7 illustrates a group of data sharing elements of a decentralized data network, according to an illustrative embodiment.

FIG. 7 illustrates a group 700 of data sharing elements (DDNs 242) of a data sharing system for managing data, according to an illustrative embodiment. The nodes 702-1, 702-2, 702-3 and 702-4 represent IPFS installations across a highly distributed system environment (e.g., environment 200 in FIG. 2A). All IPFS nodes keep a distributed hash table (DHT) to keep track of peers. These nodes also implement a BitSwap protocol to identify which nodes are currently storing which data. Data is moved between nodes by creating a "want list" that can be compared against a neighbor's "have list". Both lists essentially contain hashes of content. For example, data can be stored within the IPFS as though it were a file, but internally IPFS creates a hash of the content and adds it to the local "have list."

Once a given one of MCP 220-1 through 220-N has enough segments, it can choose to stop downloading chunks. If the given MCP has sufficient storage capacity, it can download more chunks. This feature is especially useful for MCPs that run out of storage space.

Should a given one of MCPs 220-1 through 220-N reach a capacity limit (threshold) and not be able to store the minimum file chunk size, a variety of strategies may be employed including, but not limited to: (a) deleting older files in order to free up space; (b) logging the inability to store more data; and/or (c) requesting one or more nearby MCPs 220-1 through 220-N to serve as an overflow.

MCPs 220-1 through 220-N may communicate with each other to ensure that the entire download is "reachable" by any MCP in the system. The policy file 300 may also stipulate that there must be N "reachable" download copies distributed amongst MCPs 220-1 through 220-N.

"Reachable" as illustratively used herein means that each MCP should have functioning network paths to every portion of the download. The network paths could be to stationary devices (e.g., edge servers 210-1 through 210-M) or to transitory devices (e.g., other MCPs that go in and out of range). As MCPs cross in and out of different clusters (e.g., cellular regions), gaps may be introduced in the ability to access an entire download (or maintain a minimal number of copies of a download).

Figure 8:
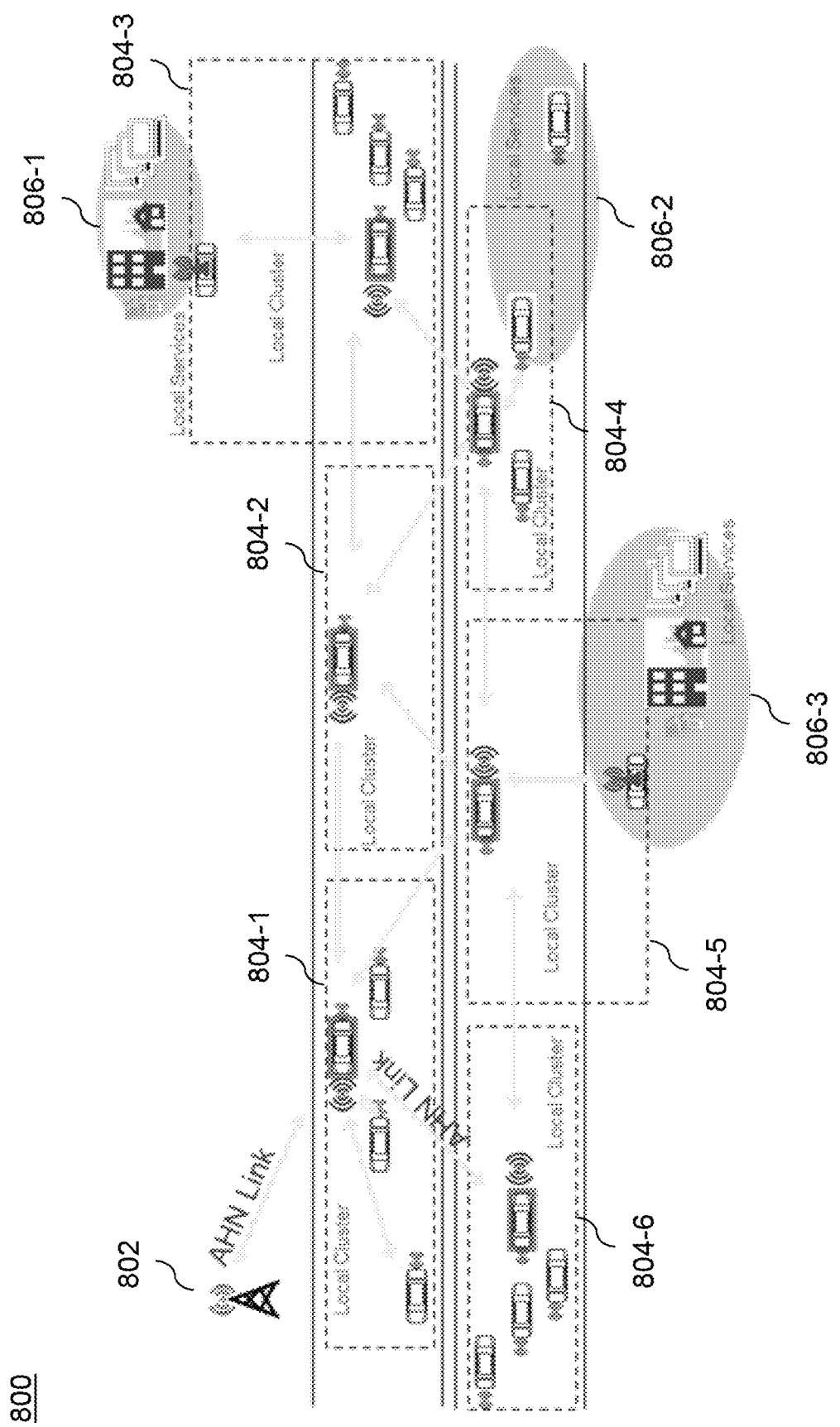
FIG. 8 illustrates a mobility use case in a highly distributed system with decentralized messaging network and decentralized data network overlays, according to an illustrative embodiment.

FIG. 8 illustrates a mobility use case 800 in a highly distributed system with decentralized messaging network and decentralized data network overlays, according to an illustrative embodiment. As shown, an ad-hoc wireless network 802 links a plurality of local clusters of MCPs (e.g., vehicles in this case) 804-1 through 804-6. A high-level coordinator (part of 802) monitors these access patterns and attempts to transfer the chunks off of departing MCPs before they travel out of range. Alternatively, these chunks may be transferred from a stationary edge server, e.g. local services 806-1 through 806-3.

Even though each MCP may only be storing a fraction (e.g., $1/64^{th}$) of a download, the applications that are accessing that file may desire to access the entire download.

In U.S. Ser. No. 15/898,443, filed on Feb. 17, 2018 and entitled "Ad-Hoc Mobile Computing," the disclosure of which is incorporated by reference herein in its entirety, an architecture is described in which "nearby" mobile compute platforms can be combined to form a "computer" in which the CPUs, memory, network, and storage are built-up/torn-down to perform compute tasks. Such architecture could create a full "virtual download" and quickly access missing chunks by paging them in from other MCPs.

In one illustrative use case, it is assumed that connected cars attempt to achieve autonomous driving via the frequent download of dynamic maps. The decentralized data management framework described herein can be applied to greatly assist in frequent dynamic map download.

Given the illustrative description of decentralized data management techniques described herein, methodology 900 comprises the following steps. In a system environment comprising a plurality of computing resources, wherein at least a portion of the computing resources are mobile, step 902 maintains a decentralized messaging network of interconnected messaging nodes and a decentralized data network of interconnected data nodes, wherein each of the plurality of computing resources is associated with a given messaging node and a given data node. Step 904 manages transfer of a data set between the plurality of computing resources in association with the decentralized messaging network and the decentralized data network, wherein managing transfer of the data set comprises inserting a policy file into the decentralized data network specifying one or more policies for managing the transfer of the data set, and inserting a message into the decentralized messaging network instructing implementation of the one or more policies, such that each of the plurality of computing resources obtains the policy file and implements the one or more policies.

At least portions of the system for decentralized data management shown in FIGS. 1-9 may be implemented using one or more processing platforms associated with one or more information processing systems. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to and executed on or across a portion of one or more virtual or physical processors. An illustrative embodiment of a processing platform will now be described in greater detail in conjunction with FIG. 10.

As is apparent from the above, one or more of the processing modules or other components of the system for decentralized data management shown in FIGS. 1-9 may each run on a computer, server, storage device or other processing platform element. A given such element may be viewed as an example of what is more generally referred to herein as a "processing device." An example of such a processing platform is processing platform 1000 shown in FIG. 10.

The processing platform 1000 in this embodiment comprises a plurality of processing devices, denoted 1002-1, 1002-2, 1002-3, . . . 1002-N, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing Peripheral Component Interconnect Express (PCIe) cards of those devices, and networking protocols such as InfiniBand, Gigabit Ethernet or Fibre Channel.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA) or other type of processing circuitry, as well as portions or combinations of such circuitry elements.

The memory 1012 may comprise random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Figure 10:
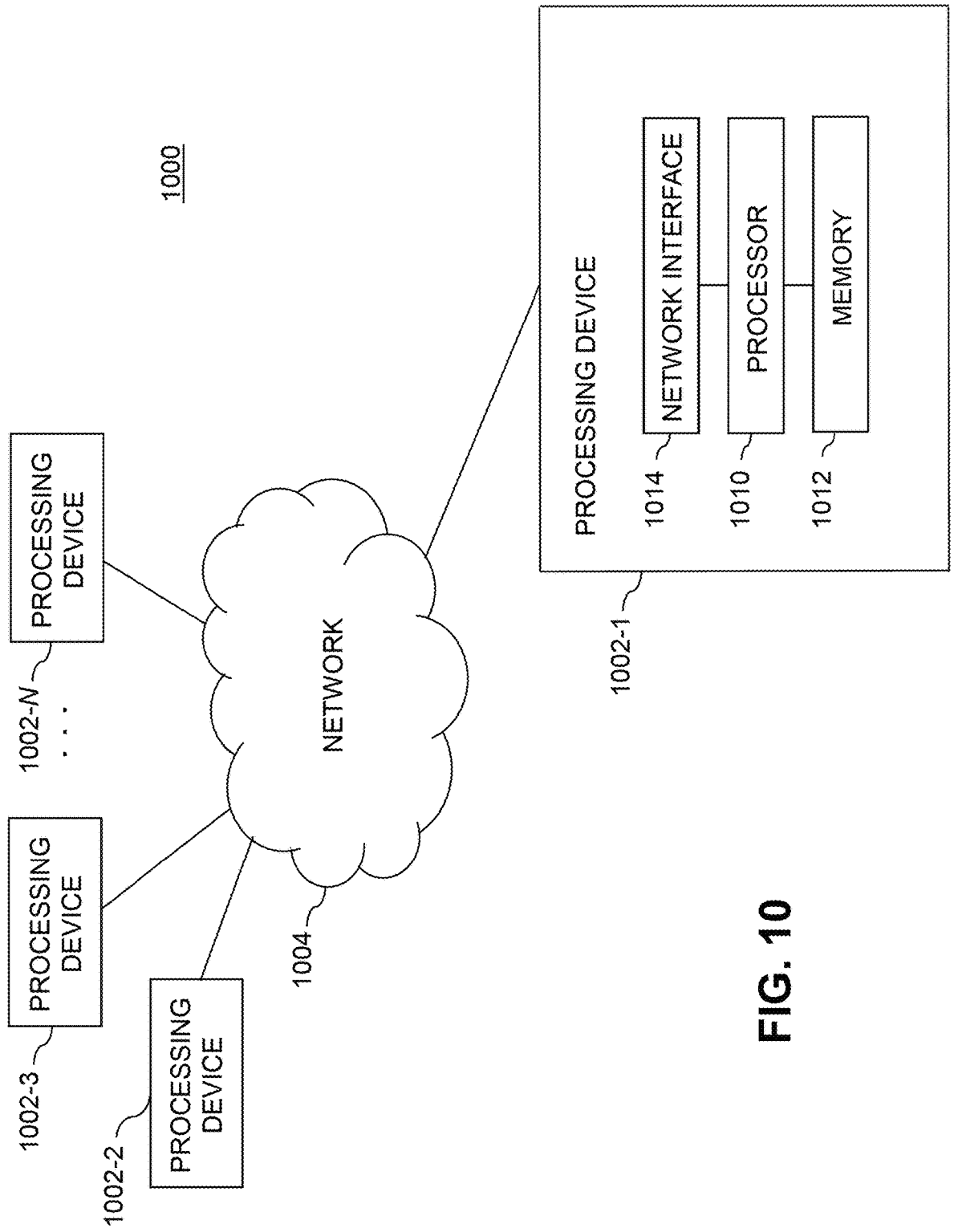
FIG. 10 illustrates a processing platform used to implement a highly distributed system with decentralized messaging network and decentralized data network overlays, according to an illustrative embodiment.

Also included in the processing device 1002-1 of the example embodiment of FIG. 10 is network interface circuitry 1014, which is used to interface the processing device with the network 1004 and other system components and may comprise conventional transceivers.

The other processing devices 1002 of the processing platform 1000 are assumed to be configured in a manner similar to that shown for processing device 1002-1 in the figure.

Again, this particular processing platform is presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment of the system for decentralized data management, although in other embodiments a given tenant can have multiple containers. The containers may be utilized to implement a variety of different types of functionality within the system. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of a system of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible in the system for decentralized data management. Such components can communicate with other elements of the system over any type of network or other communication media.

As indicated previously, in some embodiments, components of the system for decentralized data management as disclosed herein can be implemented at least in part in the form of one or more software programs stored in memory and executed by a processor of a processing device. For example, at least portions of the execution environment or other system components are illustratively implemented in one or more embodiments the form of software running on a processing platform comprising one or more processing devices.

It should again be emphasized that the above-described embodiments of the disclosure are presented for purposes of illustration only. Many variations and other alternative embodiments may be used. For example, the disclosed techniques are applicable to a wide variety of other types of systems for decentralized data management. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:

1. A method comprising:
in a system environment comprising a plurality of computing resources, each computing resource comprising a computing platform, wherein at least a portion of the computing resources are mobile, the system environment comprising a decentralized messaging network of interconnected messaging nodes and a decentralized data network of interconnected data nodes, wherein each of the plurality of computing resources comprises a given messaging node and a given data node;
managing transfer of a data set between the plurality of computing resources in association with the decentralized messaging network and the decentralized data network, wherein managing transfer of the data set comprises inserting a policy file into the decentralized data network specifying one or more policies for managing the transfer of the data set, and inserting a message into the decentralized messaging network instructing at least a portion of the plurality of computing resources to obtain the policy file;

obtaining the policy file at the portion of the plurality of computing resources in accordance with the message; and implementing the one or more policies of the policy file at the portion of the plurality of computing resources;

wherein the step of managing transfer of the data set further comprises assigning a content address to the policy file and specifying a pointer to the content address in the message to direct the portion of the plurality of computing resources where to obtain the policy file;

wherein the one or more policies of the policy file include instructions relating to at least one of download, distribution, storage or accessibility of at least portions of the data set; and wherein the method is implemented via one or more processing devices each comprising a processor coupled to a memory.

2. The method of claim 1, wherein the step of managing transfer of the data set further comprises logging a confirmation message indicating implementation of the one or more policies of the policy file by the portion of the plurality of computing resources as the computing resources implements the one or more policies.

3. The method of claim 2, wherein the confirmation messages are retrievable to audit the percentage of the portion of the plurality of computing resources that have implemented the one or more policies.

4. The method of claim 1, wherein the policy file specifies an amount of the data set that given types of the computing resources are instructed to store.

5. The method of claim 4, wherein a first type of computing resource is instructed to store the entire data set.

6. The method of claim 5, wherein the first type of computing resource is a stationary computing resource.

7. The method of claim 5, wherein a second type of computing resource is instructed to store at least a predetermined fraction of the entire data set.

8. The method of claim 7, wherein the second type of computing resource is a mobile computing resource.

9. The method of claim 1, wherein the step of managing transfer of the data set further comprises partitioning the data set into chunks.

10. The method of claim 9, wherein the step of managing transfer of the data set further comprises inserting one or more of the chunks into the decentralized data network and inserting the message into the decentralized messaging network, the message instructing the portion of the plurality of computing resources to obtain the one or more chunks.

11. The method of claim 10, wherein the step of managing transfer of the data set further comprises assigning the content address to each of the chunks and inserting the pointer to the content address of each chunk into the decentralized messaging network to direct the portion of the plurality of computing resources where to obtain the one or more chunks.

12. The method of claim 10, wherein the step of managing transfer of the data set further comprises a given one of a given type of the plurality of computing resources sharing one or more chunks of the data set which it currently stores with one or more others of the given type of the plurality of computing resources that do not currently store the one or more chunks.

13. The method of claim 12, wherein the sharing step is implemented using a distributed hash table architecture.

14. The method of claim 10, wherein the step of managing transfer of the data set further comprises managing an instance wherein a given computing resource does not have the storage capacity to store the one or more chunks.

15. The method of claim 1, wherein the step of managing transfer of the data set further comprises maintaining a reachable status for each of the plurality of computing resources and setting one of the one or more policies in the policy file to ensure that the entire data set is reachable by any given computing resource.

16. The method of claim 1, wherein the step of managing transfer of the data set further comprises aggregating functionalities from two or more of the computing resources to ensure that the aggregation of two or more computing resources obtains the entire data set.

17. The method of claim 1, wherein the plurality of computing resources comprises a cloud platform at a first level of the system environment, a plurality of edge servers coupled to the cloud platform at a second level of the system environment, and a plurality of mobile compute platforms coupled to the plurality of edge servers at a third level of the system environment.

18. An article of manufacture comprising a non-transitory processor-readable storage medium having stored therein program code of one or more software programs, wherein the program code when executed by one or more processing device causes the one or more processing devices to perform steps of:

in a system environment comprising a plurality of computing resources, each computing resource comprising a computing platform, wherein at least a portion of the computing resources are mobile, the system environment comprising a decentralized messaging network of interconnected messaging nodes and a decentralized data network of interconnected data nodes, wherein each of the plurality of computing resources comprises a given messaging node and a given data node; and managing transfer of a data set between the plurality of computing resources in association with the decentralized messaging network and the decentralized data network, wherein managing transfer of the data set comprises inserting a policy file into the decentralized data network specifying one or more policies for managing the transfer of the data set, and inserting a message into the decentralized messaging network instructing at least a portion of the plurality of computing resources to obtain the policy file;

obtaining the policy file at the portion of the plurality of computing resources in accordance with the message; and implementing the one or more policies of the policy file at the portion of the plurality of computing resources;

wherein the step of managing transfer of the data set further comprises assigning a content address to the policy file and specifying a pointer to the content address in the message to direct the portion of the plurality of computing resources where to obtain the policy file; and wherein the one or more policies of the policy file include instructions relating to at least one of download, distribution, storage or accessibility of at least portions of the data set.

19. A system comprising:

one or more processing devices coupled to a memory and configured to:

in a system environment comprising a plurality of computing resources, each computing resource comprising a computing platform, wherein at least a portion of the computing resources are mobile, the system environment comprising a decentralized messaging network of interconnected messaging nodes and a decentralized data network of interconnected data nodes, wherein each of the plurality of computing resources comprises a given messaging node and a given data node; and manage transfer of a data set between the plurality of computing resources in association with the decentralized messaging network and the decentralized data network, wherein managing transfer of the data set comprises inserting a policy file into the decentralized data network specifying one or more policies for managing the transfer of the data set, and inserting a message into the decentralized messaging network instructing at least a portion of the plurality of computing resources to obtain the policy file;

obtain the policy file at the portion of the plurality of computing resources in accordance with the message; and implement the one or more policies of the policy file at the portion of the plurality of computing resources;

wherein managing transfer of the data set further comprises assigning a content address to the policy file and specifying a pointer to the content address in the message to direct the portion of the plurality of computing resources where to obtain the policy file; and wherein the one or more policies of the policy file include instructions relating to at least one of download, distribution, storage or accessibility of at least portions of the data set.

20. The article of manufacture of claim 18, wherein:

the step of managing transfer of the data set further comprises logging a confirmation message indicating implementation of the one or more policies of the policy file by the portion of the plurality of computing resources as the computing resources implement the one or more policies; and wherein the confirmation messages are retrievable to audit the percentage of the portion of the plurality of computing resources that have implemented the one or more policies.

21. The system of claim 19, wherein:

managing transfer of the data set further comprises logging a confirmation message indicating implementation of the one or more policies of the policy file by the portion of the plurality of computing resources as the computing resources implement the one or more policies; and wherein the confirmation messages are retrievable to audit the percentage of the portion of the plurality of computing resources that have implemented the one or more policies.

* * * * *